(12) United States Patent
Van Os

(10) Patent No.: US 12,531,505 B2
(45) Date of Patent: Jan. 20, 2026

(54) MODULAR PHOTOVOLTAIC ASSEMBLY

(71) Applicant: EXA-IP B.V., Zaltbommel (NL)

(72) Inventor: Jan-Jaap Eduard Van Os, The Hague (NL)

(73) Assignee: Exa-IP B.V. (NL)

( * ) Notice: Subject to any disclaimer, the term of this patent is extended or adjusted under 35 U.S.C. 154(b) by 16 days.

(21) Appl. No.: 18/533,759

(22) Filed: Dec. 8, 2023

(65) Prior Publication Data

US 2024/0195348 A1 Jun. 13, 2024

(30) Foreign Application Priority Data

Dec. 8, 2022 (NL) ..................................... 2033690

(51) Int. Cl.
*H02S 20/25* (2014.01)
*H02S 40/10* (2014.01)
*H02S 40/36* (2014.01)

(52) U.S. Cl.
CPC .............. *H02S 20/25* (2014.12); *H02S 40/10* (2014.12); *H02S 40/36* (2014.12)

(58) Field of Classification Search
None
See application file for complete search history.

(56) References Cited

U.S. PATENT DOCUMENTS

2011/0302857 A1 12/2011 Mcclellan

FOREIGN PATENT DOCUMENTS

| CN | 205012577 U | 2/2016 |
|---|---|---|
| CN | 216290763 U | 4/2022 |
| DE | 202007008659 U1 | 8/2007 |

*Primary Examiner* — Eli S Mekhlin
(74) *Attorney, Agent, or Firm* — Fishman Stewart PLLC

(57) ABSTRACT

Provided herein is a modular photovoltaic assembly configured for installation on an exterior of a building that includes a photovoltaic panel, first and second mounting rails, and first and second mounting brackets configured to fittingly engage with each of the first and second mounting rails, where each mounting bracket has a length on the longitudinal axis between opposing first and second lateral ends, the first lateral end having a resilient arm adapted to be fittingly received in a slotted recess of a distal end of each mounting rail, the second lateral end having an upper resilient member and a lower resilient member spaced a distance apart on the z-axis, and the upper and lower resilient members are adapted to fittingly secure therebetween a portion of one of the photovoltaic panel, another adjacent photovoltaic panel, a building or fitting panel, and a roof tile.

23 Claims, 10 Drawing Sheets

MODULAR PHOTOVOLTAIC ASSEMBLY

CROSS-REFERENCE TO RELATED APPLICATIONS

This application claims benefit under 35 U.S.C. § 119(a) of N.L. Provisional Application No. 2033690 filed Dec. 8, 2022, the contents of which are incorporated herein by reference in their entirety.

FIELD OF THE INVENTION

The present disclosure relates to a modular photovoltaic assembly configured for installation on the exterior of a building, and particularly suitable for seamless integration on, for example, a roof or façade of the building, either together with or without known or commonly used building panels or roofing tiles.

BACKGROUND

Photovoltaic electricity generation has gained much attention as a renewable energy source in recent years. By extension, photovoltaic installations, on both commercial and residential buildings, have also continued to increase in popularity. The majority of existing photovoltaic installations, however, still consist of non-integrated systems, which are designed to accommodate the shape and size of photovoltaic cells, rather than the shape and size of building construction materials, e.g., building or fitting panels that are used to construct the building exteriors on which the photovoltaic panels are intended to be arranged.

These existing photovoltaic assemblies typically comprise an array of photovoltaic or solar thermal modules that are attached to a separate support structure. The support structure is usually then mounted on top of an existing roof covering or façade. These photovoltaic assemblies are relatively heavy, require significant installation efforts and are also likely to require periodic maintenance, which may or may not be insubstantial. Additional disadvantages associated with such photovoltaic assemblies may include, but are not limited to, vulnerability to potential wind or other environmental damage, vulnerability to corrosion, generation of undesired noise, formation of cold spots, and waterproofing issues, such as leakages, where the support structure(s) is/are attached to the exterior.

Accordingly, there has been a need for providing integrated photovoltaic assemblies with the structural elements of a building exterior, and particularly those that interface with known or commonly used roof coverings such as tiles, slates, and metal roofing.

WO 2022146138A1 describes one photovoltaic roof element that can be integrated into a pitched roof. The roof element is said to be much lighter than those described in the known prior art, and can be made into any convenient size which allows for relatively easier handling and installation. However, how the roof elements are mounted on the pitched roof is still rather un-simplified; it requires the fixing of retaining brackets to battens onto the roof, which requires precision in placement and can often be a time consumptive process.

Further space for improvement, therefore, remains, for example, in terms of simplification of how the photovoltaic assemblies are mounted on a building exterior, both in terms of simplifying the mounting structure(s) as well as the mounting process.

SUMMARY OF THE INVENTION

The present invention relates to a modular photovoltaic assembly configured for installation on the exterior of a building. The modular photovoltaic assembly described herein has a simplified design, which may be easily customized in shape and/or size to fit a desired area on a building exterior. Moreover, the simplified design contributes to the ability of the assembly to be mounted on a building exterior with relative speed and ease, which by extension, reduces labour efforts and costs.

A modular photovoltaic assembly configured for installation on an exterior of a building is provided comprising a photovoltaic panel having a front side, a back side, a length in the longitudinal direction on a longitudinal axis (y) between a top edge and a bottom edge, and a width in a transverse direction on a transverse axis (x) between a first side edge and a second side edge, first and second mounting rails arranged on the back side and each having opposing proximal and distal ends, and first and second mounting brackets configured to fittingly engage with each of the first and second mounting rails, each mounting bracket having a width on the transverse axis, a length on the longitudinal axis between opposing first and second lateral ends, and a height on a z-axis orthogonal to the transverse (x) and longitudinal (y) axes, the first lateral end comprising a resilient arm adapted to be fittingly received in a slotted recess of the distal end of each mounting rail, the second lateral end comprising an upper resilient member and a lower resilient member spaced a distance apart on the z-axis, and the upper and lower resilient members adapted to fittingly secure therebetween a portion of one of the photovoltaic panel, another adjacent photovoltaic panel, a building or fitting panel, and a roof tile.

The provision of first and second brackets that are configured to fittingly engage with each of the first and second mounting brackets is desirable because this arrangement necessitates less precision in placement, of both the mounting rails and the mounting brackets on the building exterior, to effectively mount the instant modular assembly than traditional photovoltaic assemblies. This means that the assembly can be installed with relative speed and ease. Not to mention, the assembly can be readily installed in tandem by a pair of installers—one to secure the mounting brackets onto the building and the other to mount the photovoltaic panel(s), building or fitting panel(s), or roof tile(s) thereon.

The fitting engagement of the mounting rails and the mounting brackets is also desirable because the photovoltaic panel(s) can be easily mounted, adjusted, and removed. With the mounting brackets affixed in position on the building exterior, there are no additional components needed to mount the photovoltaic panel(s) thereon. The photovoltaic panel(s) may simply be slid into position and secured proximal to the top edge between the upper and lower resilient members of one mounting bracket and proximal to the opposing bottom edge by the reception of the resilient arm of another mounting bracket in the slotted recess of the distal end of the mounting rail.

The proximal end of each mounting rail is positioned proximal to the top edge of the photovoltaic panel. This increases the profile of the panel in the z-direction at the top edge and provides a combined height of the photovoltaic panel and the mounting rail that corresponds with the distance between the upper and lower resilient members of the mounting brackets, and more specifically the distance between the upper resilient member and the maximum height of the retention element of the lower resilient member. Because of this increased profile, the photovoltaic panel will not be translated in the z-direction (i.e., toward the roof) when the photovoltaic panel is mounted between the first and second mounting brackets.

It follows that the distal end of each mounting rail is thus arranged proximal to or at least relatively closer to the bottom edge of the photovoltaic panel than the opposing proximal end. In fact, the distal end of each mounting is preferably spaced a distance away from the bottom edge of the photovoltaic panel in the y-direction. This spacing enables the photovoltaic panel to be easily manipulated during any of mounting, adjustment, and removal of the panel to or from the mounting brackets.

The upper and lower resilient members are arranged in parallel or essentially parallel in the longitudinal direction. This arrangement generally corresponds with the shape and/or dimensions of the photovoltaic panel that is to be fittingly secured between the upper and lower resilient members.

The upper and lower resilient members each extend a length ($l_U$, $l_L$) on the longitudinal axis from a central vertical member to a respective free end edge. It is also preferable that the length of the lower resilient member has a longer extension than the length of the upper resilient member ($l_L > l_U$). Having an upper resilient member that is shorter than the lower resilient member contributes to the relative ease of installation of the photovoltaic panel between the mounting brackets because it provides clearance for the proximal rail to slide over the retention element on the lower resilient member. This also gives a wide range for the angle at which the proximal end of the photovoltaic panel can be introduced between the upper and lower resilient members. In this regard, the upper resilient member is not the first portion of the mounting bracket to come into contact with the photovoltaic panel. As such, the upper resilient member does not initially interfere with or restrict the photovoltaic panel's movement in the zy-plane, at least not until after the proximal end (e.g., top edge) of the panel either contacts or clears a portion of (e.g., the maximum height) the retention element The lower resilient member may comprise a retention element. The retention element has a length on the longitudinal axis (y) and a maximum height on the z-axis dimensioned such that the retention element contacts the portion of the photovoltaic panel, the another adjacent photovoltaic panel, the building or fitting panel, or the roof tile fittingly secured between the upper and lower resilient members. When the panel is mounted between the first and second mounting brackets, the back side, and more specifically, the mounting rail affixed thereto, rests on the retention element, which in part, keeps the panel from being translated further downward on the z-axis in toward the roof. It is also preferable that the retention element is provided on a portion of the lower resilient member that extends past a free end edge of the upper resilient member in the longitudinal direction.

The shape of the retention element is not particularly limited. The retention element may take any form, such as a triangle, square, other polygon, or other irregular shape, provided that the retention element has a height above the lower resilient member with which the photovoltaic panel, other adjacent photovoltaic panel, building or fitting panel, or roof tile is in contact when fittingly installed between the upper and lower resilient members.

In one non-limiting embodiment, the retention element may have an omega shape comprising an upward sloping portion, the maximum height, and a downward sloping portion that is preferably arranged proximal to the free end edge of the lower resilient member.

The maximum height of the retention element is generally selected to be equal or essentially equal to a thickness (i.e., the height in the z-direction) of the portion of the photovoltaic panel (or other building or fitting panel, or roof tile), including the mounting rail affixed thereto, to be fittingly secured between the upper and lower resilient members of the mounting bracket. This assists to keep the photovoltaic panel in place, in the z-direction, so that it does not translate downwardly toward the building exterior on which the mounting bracket is affixed.

Additionally, the maximum height of the retention element may assist to prevent an electrical connector arranged between the upper and lower resilient members from moving in the longitudinal direction (y) toward the free end edge of the lower resilient member. Thus, in one non-limiting embodiment, the maximum height may be equal or essentially equal to the radius of an electrical connector.

The first and second lateral ends of the mounting bracket may each further comprise a fastener notch. Each mounting bracket is preferably formed from a material that typically has a relatively smooth surface, and by extension, a surface texture that can be considered slippery. Having a fastener notch in one or both of the lateral ends of each mounting bracket can provide a different texture for the material surface of the mounting brackets. This is advantageous for installing the mounting brackets to the building exterior because the notches provide visible and tactile indications where a typical fastener (e.g., self-drilling screw) should be affixed; the typical fasteners will interface with the notch and should not slip. Further, the shape of the fastener notch is not particularly limited. In one non-limiting example, the fastener notch may have a v-shape, and preferably complements a shape of the fastener(s) used to secure the mounting brackets to the building exterior, The proximal end of each mounting rail preferably comprises a taper from a first width (w1) to a second width (w2). The taper is oriented to begin at the first width and end at the second width. Accordingly, the first width is larger (i.e., w1>w2). Stated differently, the first width (w1) has a longer extension in the transverse direction, than the second width (w2). The provision of a taper in the proximal end of each mounting rail is desirable because it contributes to the ease of installation of the photovoltaic panel between the upper and lower resilient members of a mounting bracket. In this sense, the taper enables the photovoltaic panel to slide over the retention element during mounting and removal of the panel from the mounting bracket. This also means that the angle at which the photovoltaic panel is oriented in the zy-plane with respect to the longitudinal axis can be larger than a panel without such a taper at its proximal end.

Each mounting rail may comprise a first pair of spacers on the proximal end and a second pair of spacers on the distal end. The spacers are preferably provided on opposing lateral mounting rail wings. The lateral mounting rail wings have a planar surface that interfaces with the photovoltaic panel when the mounting rails are affixed to the panel. The spacers create a relatively small space between the planar surface and the glass of the photovoltaic panel in which the adhesive kit is applied to secured the rails to the panel. By having this space, squeezing out of the adhesive kit from the two surfaces can be minimized, if not all together avoided.

Additionally, the space provided by the spacers is tangentially useful for transport of the mounting rails prior to being affixed to a photovoltaic panel. This is because the mounting rails can be stacked and easily separated from one another, without the need for having an additional packaging material spacer, (e.g., a sheet of polymer, plastic, polystyrene or the like) between adjacent rails.

It is preferred that the mounting rails are each formed from a single sheet of material. Additionally or alternatively, it is preferred that the mounting brackets are each formed from a single sheet of material.

Though not particularly limited, the first and second mounting rails and/or the first and second mounting brackets may comprise a metal. One exemplary metal is steel. Steel is advantageous because it is relatively easy to manipulate and/or form into a desired configuration (i.e., fold). Plus, steel is desirable for its resistance to corrosion, fire and weather.

For either or both of the mounting brackets and the mounting rails, the source material may further comprise a corrosion resistance coating. In one non-limiting embodiment, the coating preferably comprises zinc, aluminium, and magnesium. The thickness of the corrosion resistance coating is not particularly limited, and may be adjusted by one of skill in the art as desired. However, in one non-limiting example, the coating has a thickness in a range of 5 to 35 microns.

Each mounting bracket can be provided in the form of an elongate bracket member. The elongate member bracket may be preferably formed from a single, continuous sheet of material. In this regard, the elongate member bracket can have a unitary structure.

Each mounting bracket has a width that extends continuously along the transverse axis (x) and preferably over at least the width of the photovoltaic panel. The extension of the width, however, is not particularly limited, and it may be shorter, equal to, or longer than the width of the photovoltaic panel. The width of each mounting bracket may even extend over a width equivalent to a plurality of photovoltaic panels.

Each mounting rail may also be provided in the form of an elongate member. The elongate member may be preferably formed from a single, continuous sheet of material. In this regard, each mounting rail can have a unitary structure.

It is also envisioned that each mounting rail may be provided in the form of a plurality of discontinuous elongate member segments. In other words, each mounting rail may comprise two or more discontinuous elongate member segments.

The modular photovoltaic assembly may further comprise at least one gutter panel. The gutter panel has a width on the transverse axis (x) and a length on the longitudinal axis (y). The gutter panel is arranged against one of the first and second side edges of the photovoltaic panel. The gutter panel is configured to prevent ingress of liquid or solid material underneath the photovoltaic panel.

The gutter panel preferably comprises a vertical partition. This vertical partition extends along the length, preferably the entire length, of the gutter panel. When positioned adjacent to at least one photovoltaic panel, the vertical partition is the portion of the gutter panel that contacts or nearly contacts the side edge of the panel. This can protect the panel glass along the side edge from being damaged (e.g., scratched) since it will not be possible for the side edge to come into contact with another surface (e.g., the side edge of an adjacent photovoltaic panel, building or fitting panel, or roofing tile).

Also, the vertical partition divides the width of the gutter panel into first and second transverse sides. The first and second transverse sides may be different or equal in size; in other words the vertical partition may or may not be positioned at the midpoint of the gutter panel in the transverse direction (x). Regardless of size, each of the first and second transverse sides comprises at least one longitudinal channel. The longitudinal channels extend along the length, preferably the entire length, of the gutter panel in the longitudinal direction (y). These channels advantageously direct fluid (e.g., rain water) across the panel and minimize, if not prevent, the ingress of such fluid underneath the backside of the panel.

Additionally, the photovoltaic panel may comprise one or more electrical connectors. In a preferred embodiment, the photovoltaic panel comprises a first electrical connector arranged on the back side and between the first side edge and the first mounting rail and a second electrical connector arranged on the back side and between the second side edge and the second mounting rail.

The photovoltaic panel may also comprise at least one junction box.

The modular photovoltaic assembly is designed for installation on the exterior of a building, preferably on a roof or a façade thereof. Moreover, the modular photovoltaic assembly is designed to be fully integrated into the exterior either with or without roofing tiles or other building or fitting panels.

BRIEF DESCRIPTION OF THE DRAWINGS

The present invention will be discussed in more detail below, with reference to the attached drawings, in which.

DESCRIPTION OF EMBODIMENTS

Figure 1:
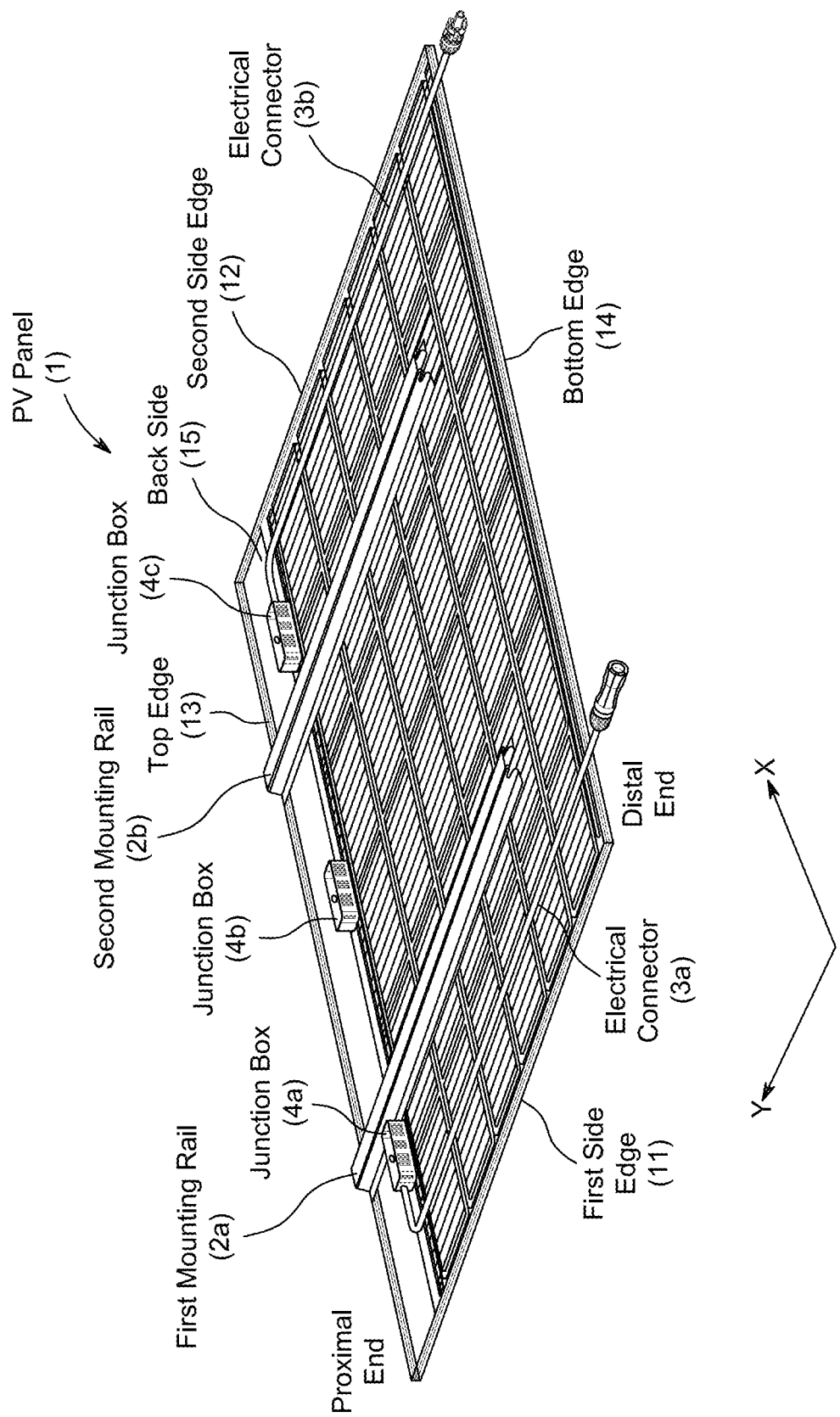
FIG. 1 shows an exemplary photovoltaic panel.

FIG. 1 shows an exemplary photovoltaic panel (1) of the modular photovoltaic assembly according to the present disclosure. The panel has a width in the transverse direction on a transverse axis (x) between a first side edge (11) and a second side edge (12), a length in the longitudinal direction on a longitudinal axis (y) between a top edge (13) and a bottom edge (14), a front side, and a back side (15). First and second mounting rails (2a, 2b) are mounted on the back side of the panel. Each mounting rail may, as shown in this non-limiting example, take the form of an elongate member that has a length between opposing proximal and distal ends. The proximal end of each mounting rail is shown positioned proximal to the top edge of the photovoltaic panel. It is to be understood that the proximal ends of the mounting rails may also be considered to be positioned at or adjacent to the top edge. The distal ends of the mounting rails are thus arranged nearer to the bottom edge of the photovoltaic panel that the opposing proximal ends. In the embodiment depicted in FIG. 1, the length of each mounting rail has a shorter extension in the longitudinal direction (y) than the photovoltaic panel. The distal ends of the mounting rails are thus not arranged directly at, but rather are spaced a distance from the bottom edge of the photovoltaic panel.

The back side of the photovoltaic panel may also comprise other elements, such as a junction box (4) and/or an electrical connector (3). It is to be understood, however, that the number and placement of these additional elements is not particularly limited. In other words, the panel may comprise one or more of either or both of a junction box and an electrical connector, and each junction box and electrical connector can be arranged on any portion of the back side of the panel. For example, in FIG. 1, there are three junction boxes (4a, 4b, 4c), each of which is mounted adjacent to the top edge of the panel. In this particular non-limiting example, one junction box is arranged between the first side edge and the first mounting rail, one junction box is arranged between the first and second mounting rails, and the other junction box is arranged between the second mounting rail and the second side edge. Additionally, there are two electrical connectors (3a, 3b) provided on the exemplary photovoltaic panel in FIG. 1, each arranged adjacent to one of the first and second side edges.

Figure 2:
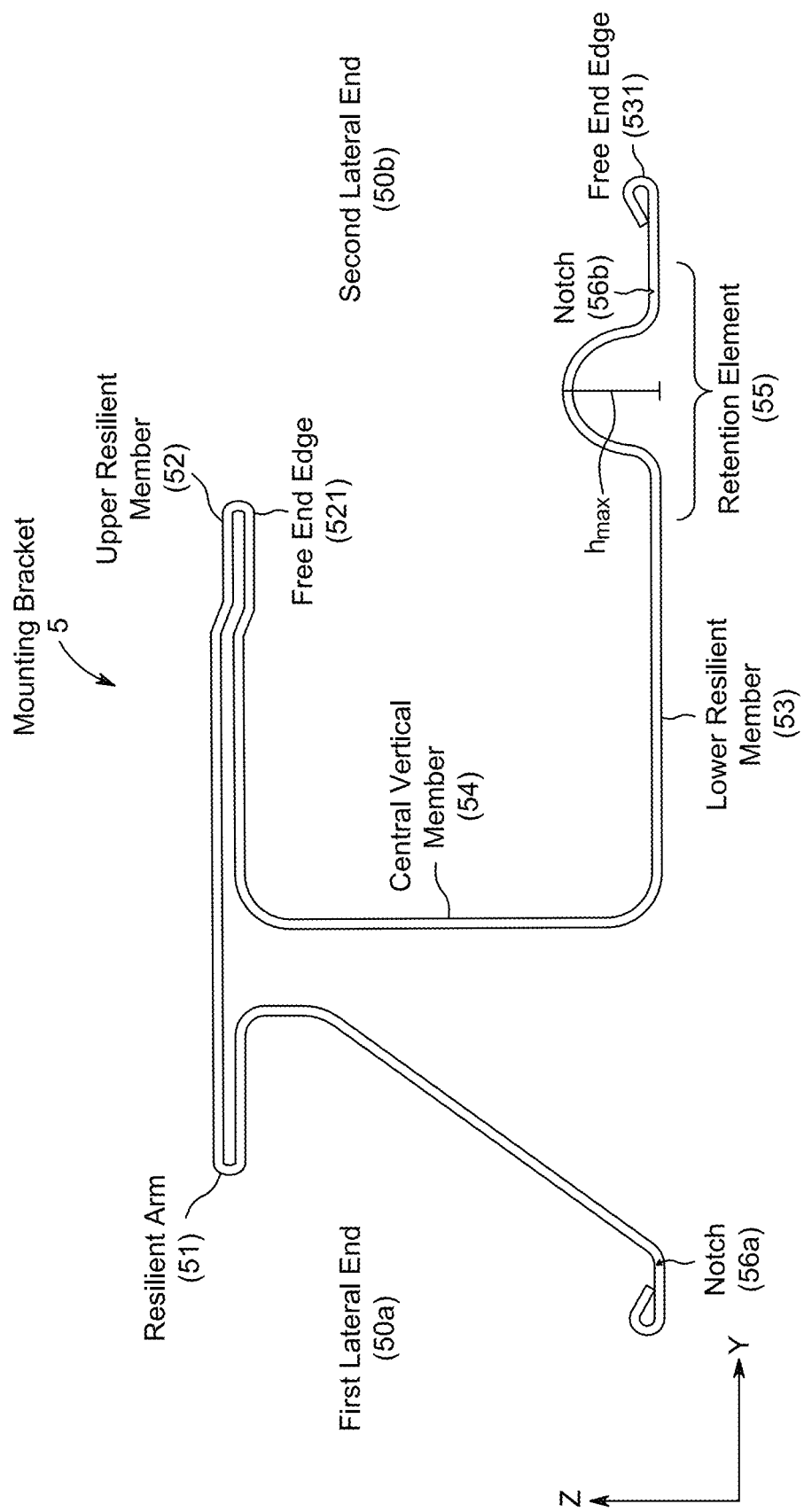
FIG. 2 shows a cross-section taken along a z-axis of an exemplary mounting bracket.

FIG. 2 shows a cross-section of an exemplary mounting bracket (5) taken along the z-axis. The mounting bracket has a length on the longitudinal axis (y) with opposing first and second lateral ends (50a, 50b). The first lateral end (50a) has a resilient arm (51) which is configured to be fittingly received in a slotted recess (21) formed in the distal end of each mounting rail. The second lateral end (50b) includes an upper resilient member (52) and a lower resilient member (53). The upper and lower resilient members are spaced a distance apart on the z-axis, in parallel on the longitudinal axis (y), and are adapted such that a portion of any one of the photovoltaic panel, another adjacent photovoltaic panel, another building or fitting panel, or a roof tile, may be mounted and fittingly secured therebetween. Further, the upper and lower resilient members each extend a length ($I_U$, $I_L$) on the longitudinal axis (y) from a central vertical member (54) to a respective free end edge (521, 531). Although not particularly limited, it is preferred that the lower resilient member has a longer extension on the longitudinal axis (y) than the upper resilient member, (i.e., $I_L > I_U$), and as shown in FIG. 2. Additionally, the upper resilient member is arranged to push down on the photovoltaic panel, another adjacent photovoltaic panel, another building or fitting panel, or a roof tile when mounted in the mounting bracket. This arrangement contributes to blocking the ingress of fluid (e.g., rain water) underneath the modular photovoltaic assembly.

The lower resilient member further comprises a retention element (55). The retention element has a length on the longitudinal axis (y) and a maximum height ($h_{max}$) on the z-axis. The length and the maximum height are selected such that the retention element comes into contact with the portion of the photovoltaic panel, the another adjacent photovoltaic panel, the other building or fitting panel, or the roof tile fittingly secured between the upper and lower resilient members. It also ensures that the panel glass on the back side is spaced a non-zero distance apart from the lower resilient member of the mounting bracket. Stated differently, the mounting rails arranged on the back side of the panel, rather than the back side itself, come into direct contact with the retention element. Such contact between the retention element and an exemplary adjacent photovoltaic panel is depicted, for example, in FIG. 3. Also, the retention element is preferably provided on a portion of the lower resilient member that extends past the free end edge (521) of the upper resilient member in the longitudinal direction. The retention element can thus be considered as an abutment that serves to support the photovoltaic panel, the another adjacent photovoltaic panel, the other building or fitting panel, or the roof tile mounted between the upper and lower resilient members in the z-direction.

The shape of the retention element is not particularly limited provided that the retention element is appropriately dimensioned such that it contacts the portion of the photovoltaic panel, the another adjacent photovoltaic panel, the other building or fitting panel, or the roof tile fittingly secured between the upper and lower resilient members. To this effect, the retention element may take any form, including but not limited to, a triangle, square, other polygon, or other irregular shape.

In the non-limiting example shown in FIG. 2, the retention element has an omega shape. This type of shape comprises an upward sloping portion, the maximum height, and a downward sloping portion. For reference purposes, and without particular limitation, the downward sloping portion is preferably arranged proximal to the free end edge (531) of the lower resilient member.

One or both of the first and second lateral ends may also be provided with a fastener notch (56a, 56b). These notches are provided to facilitate installation of the mounting bracket onto the exterior of the building. Typically, the surface of the mounting bracket is relatively smooth, which in turn, can make for a relatively slippery surface onto and through which fasteners (e.g., self-drilling screws) are affixed to secure the mounting bracket on the building exterior. The slipperiness of the surface can make it more difficult and/or consume more time to install the mounting bracket. The notches, therefore, provide a different surface texture for the fasteners. The different surface texture is readily identifiable, and by extension, assists to improve the relative speed and ease by which the mounting bracket can be mounted onto the building exterior. Further, the notches may take any form, as the shape is not particularly limited. In a preferred, but non-limiting embodiment, the notches are v-shaped; the v-shape is preferable as it may be complementary with the tip of a fastener (e.g., a self-drilling screw).

The mounting brackets are typically formed from a single sheet of material. The sheet of material is preferably folded into a particular configuration. In this sense, each mounting bracket preferably has a unitary structure. Though the source material is not specifically limited, the mounting brackets preferably comprise a metal. One non-limiting example is steel, which has a number of advantages, including but not limited to, being readily available, cost-effective, relatively easy to manipulate and/or form into a desired configuration (i.e., fold), and resistant to corrosion, fire and weather.

Additionally, during formation of the mounting brackets, the material may be folded such that the resilient arm and the upper resilient member each comprise a gap in the z-direction. In other words, and as can be seen in FIG. 2, for example, there is a relatively small space between where the material folds on the first lateral end transition into the resilient arm, and again, where the material folds on the second lateral end transition into the upper resilient member. These gaps facilitate airflow in the upper portion of the mounting bracket, which in turn, serves to reduce air resistance. The reduction of air resistance creates more ventilation through the mounting bracket, and by extension, underneath any photovoltaic panel, other building or fitting panel, or roof tile, mounted thereon.

Either or both of the free end edge of the lower resilient member and a free end edge on the first lateral end may also comprise a bend. Such bends can be desirable, for example, to prevent injury to an installer of the mounting bracket during installation on the building exterior. More specifically, the bends create a rounded edge, which can prevent or reduce the chance of the installer being cut and/or the mounting bracket from being caught or snagged, for example, on the installer, tool, or other surface.

Figure 3:
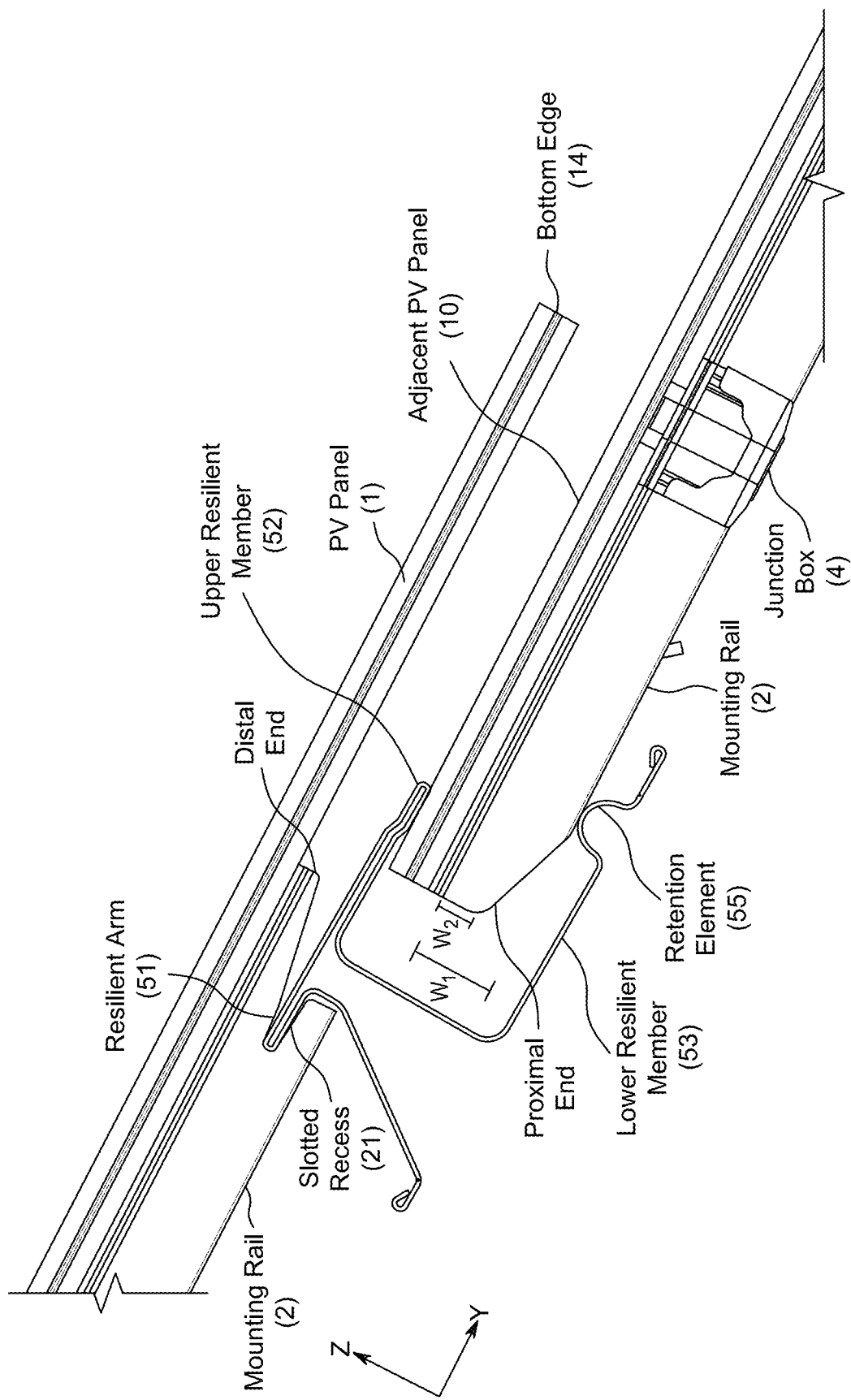
FIG. 3 shows a cross-section taken along a z-axis an exemplary mounting bracket arranged between two adjacent photovoltaic panels.

An exemplary mounting bracket is shown arranged between two adjacent photovoltaic panels in FIG. 3. On the first lateral end of the mounting bracket, the resilient arm is shown to be fittingly received in the slotted recess (21) in the distal end of the mounting rail (2) arranged on the photovoltaic panel (1). Here, the distal end of the mounting rail is arranged relatively proximal to, but spaced a distance in the longitudinal direction away from, the bottom edge of the panel (1). A portion of the panel (1) is thus arranged above the adjacent photovoltaic panel (10) in the zy-plane. In the non-limiting example shown in FIG. 3, the length over which the panel (1) extends over the adjacent photovoltaic panel (10) essentially corresponds with the length of the panel (1) from the distal end of the mounting rail to the bottom edge; however, it is to be understood that this length is not particularly limited and can be adjusted as desired by one of ordinary skill.

On the second lateral end of the mounting bracket, a portion of the adjacent photovoltaic panel (10) is shown to be fittingly secured between the upper and lower resilient members. Here, the retention profile on the lower resilient member contacts the mounting rail (2) arranged on the back side of the adjacent photovoltaic panel.

The proximal end of the mounting rail on the adjacent photovoltaic panel also comprises a taper from a first width (w1) to a second width (w2). Such a taper may be provided on the proximal end of each mounting rail to facilitate mounting of the panel onto the mounting brackets. In this non-limiting example, the start of the taper from the first width (w1) coincides with the upward sloping portion of the retention element and the taper ultimately terminates at a proximal end edge of the mounting rail, which has the second width (w2). In this regard, w1>w2. It is to be understood, however, that the relative taper from the first width to the second width is not particularly limited otherwise and can be gradual or sharp; in any case, it is contemplated that the taper may be readily adjusted by the skilled person to be dimensioned as desired.

In a non-limiting example, each mounting bracket comprises an elongate bracket member. The elongate bracket member has a width that extends continuously, i.e. without any breaks or gaps, on the x-axis from one side of the bracket to the other. As such, the elongate bracket member, and by extension the mounting bracket, may have a unitary structure. In another non-limiting example, each mounting bracket may comprise a plurality of discrete bracket member segments arranged along the transverse axis (x). The bracket member segments may be arranged discontinuously, i.e. spaced a distance apart from each other along the transverse axis. For example, the plurality of discrete bracket member segments may comprise two discrete bracket member segments; each discrete segment having a width on the transverse axis (x) that is equal to one-third of the width of the photovoltaic panel, and one discrete segment may be arranged to engage with the first mounting rail whereas the other discrete segment may be arranged to engage with the second mounting rail. The widths of the elongate bracket member and the discrete bracket member segments are not particularly limited, but it is contemplated that the plurality of discrete bracket member segments together may have the same or a different width than a single elongate bracket member. In any case, the respective widths of the elongate bracket member and/or the discrete bracket member segments may be readily adjusted as desired by one of ordinary skill.

Figure 4:
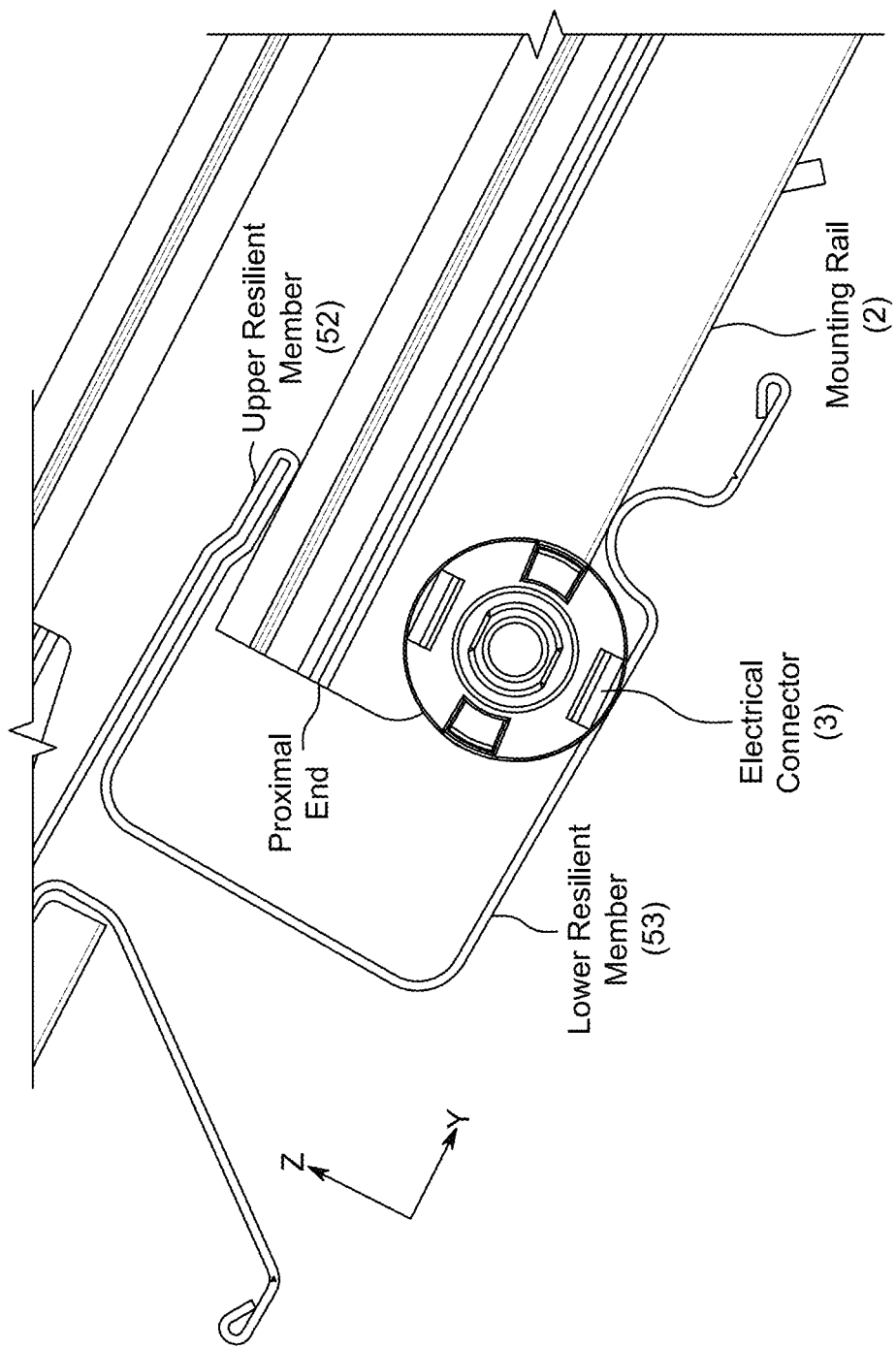
FIG. 4 shows a cross-section taken along a z-axis of the proximal end of an exemplary photovoltaic panel and an electrical connector arranged between the upper and lower resilient members of an exemplary mounting bracket.

FIG. 4 shows a side view of another non-limiting example of a portion of a photovoltaic panel mounted between the upper and lower resilient members of an exemplary mounting bracket. The arrangement here is similar to that depicted in FIG. 3, but further includes an electrical connector (3) disposed between the proximal end of the mounting rail and the lower resilient member. In this non-limiting example, The taper in the proximal end of the mounting rail can be considered to create a space between the mounting rail and the lower resilient member in which the electrical cable of the electrical connector can fit. This space may also restrict movement of the electrical connector in the zy-plane.

Additionally, the retention element restricts movement of the electrical connector, particularly along the longitudinal axis (y) in the direction of the free end edge of the lower resilient member. In this regard, the retention element serves as an abutment that prevents the electrical connector from being displaced outside of the mounting bracket when mounted therein, preferably together with one of a photovoltaic panel, building or fitting panel, or roof tile. The maximum height of the retention element is, therefore, chosen to ensure that the electrical connector cannot be displaced in the longitudinal direction past the retention element. For example, in one non-limiting embodiment, the maximum height of the retention element is equal to or essentially equal to a radius of the electrical connector.

Figure 5:
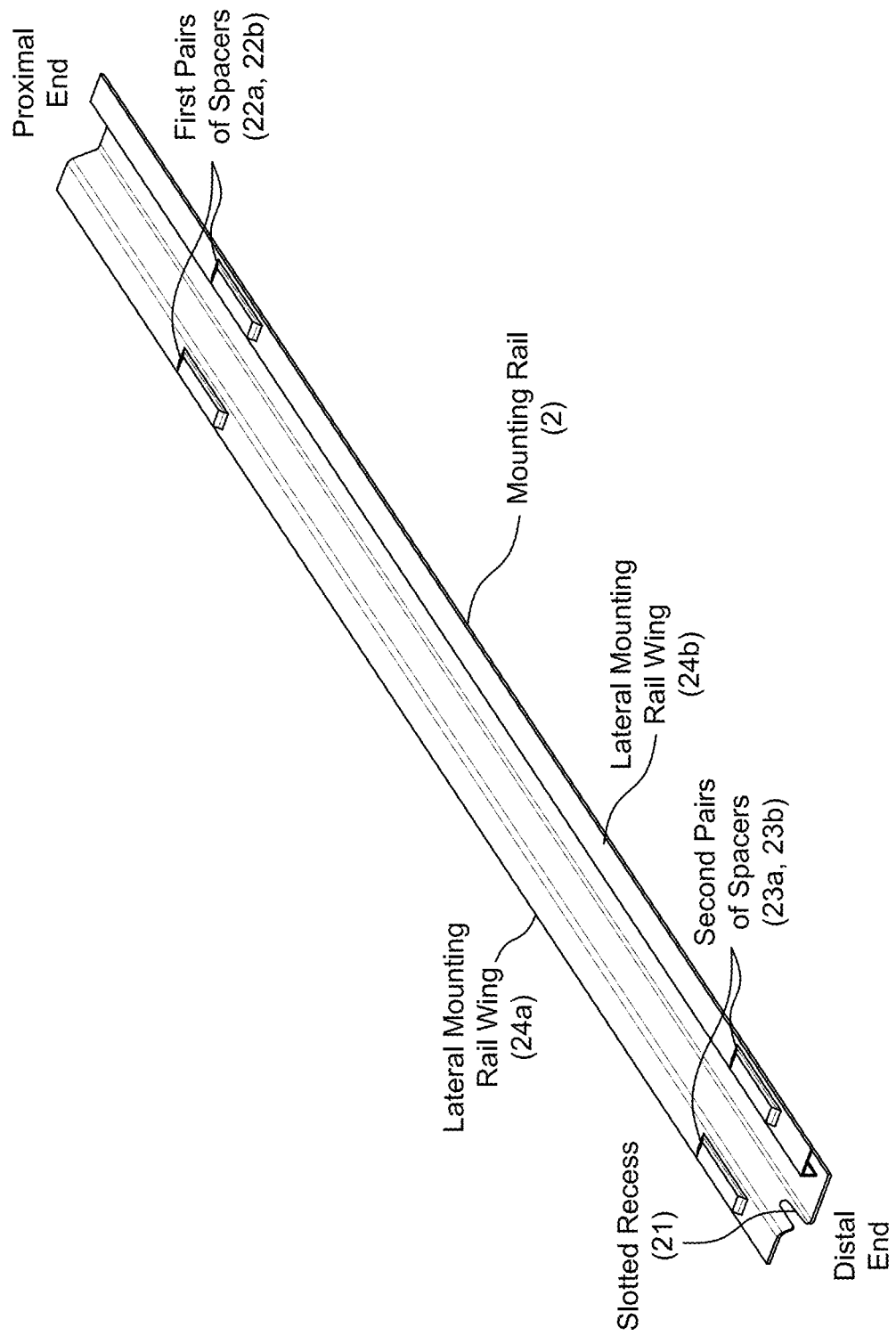
FIG. 5 shows an exemplary mounting rail.

Each mounting rail may be provided with a first pair of spacers (22a, 22b) and a second pair of spacers (23a, 23b), as shown, for example, in FIG. 5. One pair of spacers is provided on the distal end of the mounting rail while the other pair of spacers is provided on the proximal end. The spacers are raised a distance (i.e., a height) above a planar surface of the mounting rail, more specifically the planar surface of the lateral mounting rail wings (24a, 24b). This distance corresponds to a thickness of the kit (e.g., adhesive material) that is applied along the length of the lateral mounting rail wings to affix the rail to the photovoltaic panel. If the distance is not appropriately dimensioned with respect to the kit, it is possible that the adhesive may not reach the photovoltaic panel, if the distance is too large; or in the alternative, the adhesive may be squeezed out from between the photovoltaic panel and the mounting rail if the distance is too small. It is, therefore, preferred that only the spacers directly contact the glass surface of the photovoltaic panel when the mounting rail is affixed.

In one non-limiting example, each mounting rail comprises an elongate member. The elongate member has a length that extends continuously, i.e. without any breaks or gaps, between the proximal and distal ends of the mounting rail. As such, the elongate member, and by extension the mounting rail, may have a unitary structure. In another non-limiting example, each mounting rail may comprise a plurality of elongate member segments arranged along the longitudinal axis (y). The elongate member segments may be arranged discontinuously, i.e. spaced a distance apart from each other along the longitudinal axis. For example, the plurality of elongate member segments may comprise two elongate member segments; each segment having a length that is equal to one-fourth of the length of the photovoltaic panel, and one segment may be positioned proximal to the top edge of the photovoltaic panel whereas the other segment may be positional relatively more proximal to the bottom edge of the panel. The lengths of the elongate member and the elongate member segments are not particularly limited, but it is contemplated that the plurality of elongate member segments together may have the same or a different length than a single elongate member. In any case, the respective lengths of the elongate member and/or the elongate member segments may be readily adjusted as desired by one of ordinary skill.

The mounting rails are typically formed from a single sheet of material, similar to the mounting brackets. The sheet of material is preferably folded into a desired configuration. Accordingly, it is preferred that each mounting rail has a unitary structure. Again, though the source material is not specifically limited, the mounting rails preferably comprise a metal. One non-limiting example is steel.

For either or both of the mounting brackets and the mounting rails, the source material may be steel, preferably Magnelis® steel. Magnelis® steel comprises a steel substrate with a metallic coating layer and is highly desirable for its corrosion resistance. The steel substrate may have a thickness in a range of 0.45 to 0.6 mm. The steel is dipped into a molten bath of Magnelis® which includes zinc, aluminium, and magnesium. In one non-limiting embodiment, the Magnelis® coating comprises zinc, 3.5% aluminium, and 3% magnesium. Additionally, the Magnelis® metallic coating layer may have a thickness in a range of 5 to 35 microns on any one surface of the substrate.

Figure 6:
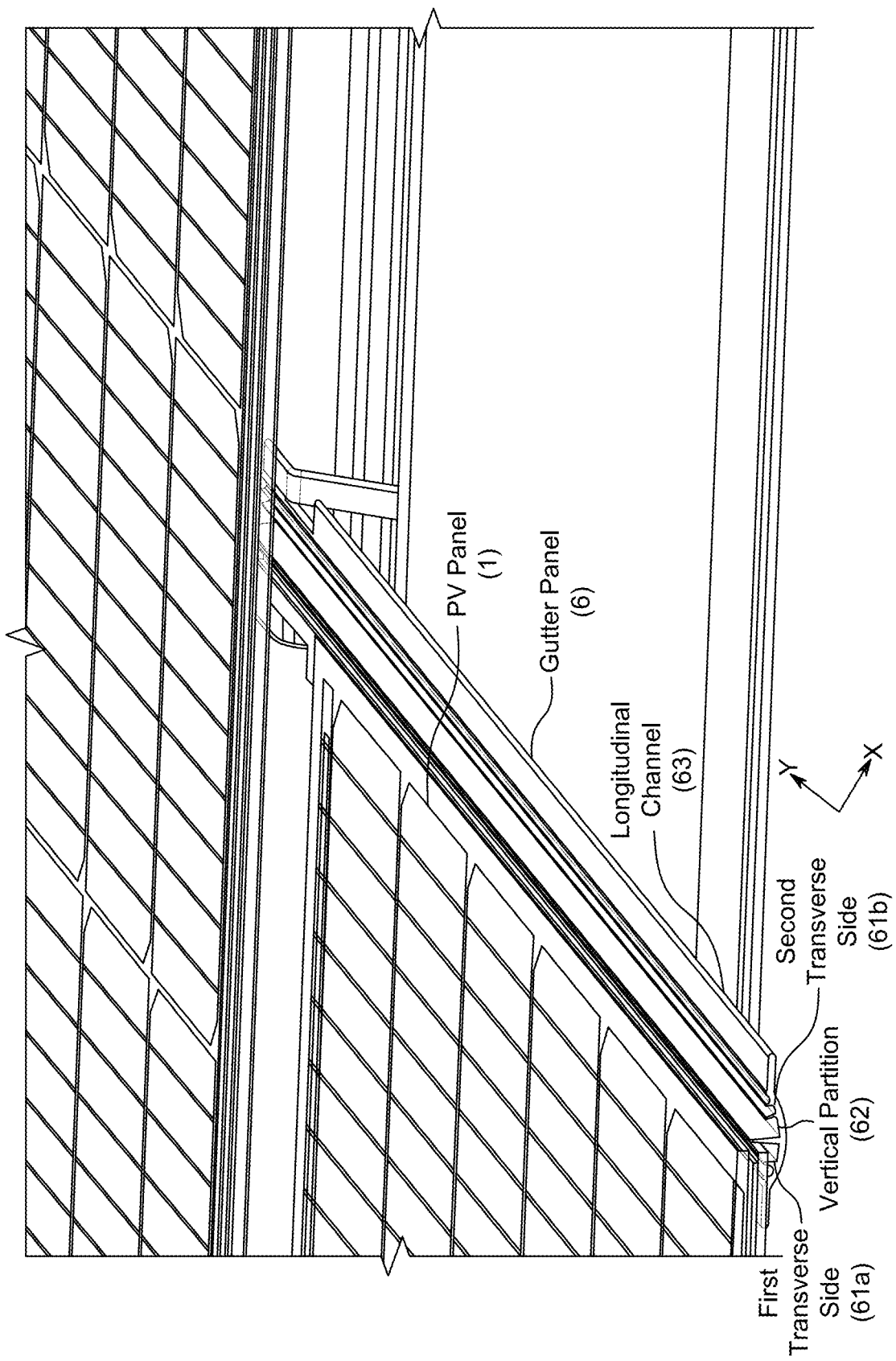
FIG. 6 shows an exemplary gutter panel.

The modular photovoltaic assembly may further comprise a gutter panel that is configured to prevent ingress of liquid or solid material underneath one or more adjacent photovoltaic panels. An exemplary gutter panel (6) arranged in combination with a photovoltaic panel is illustrated in FIG. 6. The gutter panel has a width on the transverse axis (x) and a length on the longitudinal axis (y). The length in the longitudinal direction is preferably equal to or essentially equal to the length of the photovoltaic panel (1) against which it is intended to be arranged. It is, however, contemplated that the gutter panel may also be arranged against another building or fitting panel or a roof tile, and so the length of the gutter panel may also correspond with such an adjacent building or fitting panel or a roof tile.

The gutter panel comprises a vertical partition (62) that extends along the length of the gutter panel. The vertical partition divides the width of the gutter panel into first and second transverse sides (61a, 61b). The first and second transverse sides may have the same or different extensions in the transverse direction (x). At least one longitudinal channel (63) is provided on each of the first and second transverse sides. It is preferable that the channels extend the entire length of the gutter panel in the longitudinal direction (y). These channels aid to direct the flow of fluid(s) (e.g., rain water) across the modular photovoltaic assembly. Each channel has a depth and a width appropriately dimensioned such that it may inhibit, if not prevent, movement of the fluid(s) in the transverse direction (x). This may be particularly advantageous for windy conditions or otherwise where external forces act to move the fluid(s). Further, the sizing of the longitudinal channels, with respect to other channels either on the same transverse side or on the other transverse side, is not particularly limited; the channels may have the same or different dimensions.

Figure 7A:
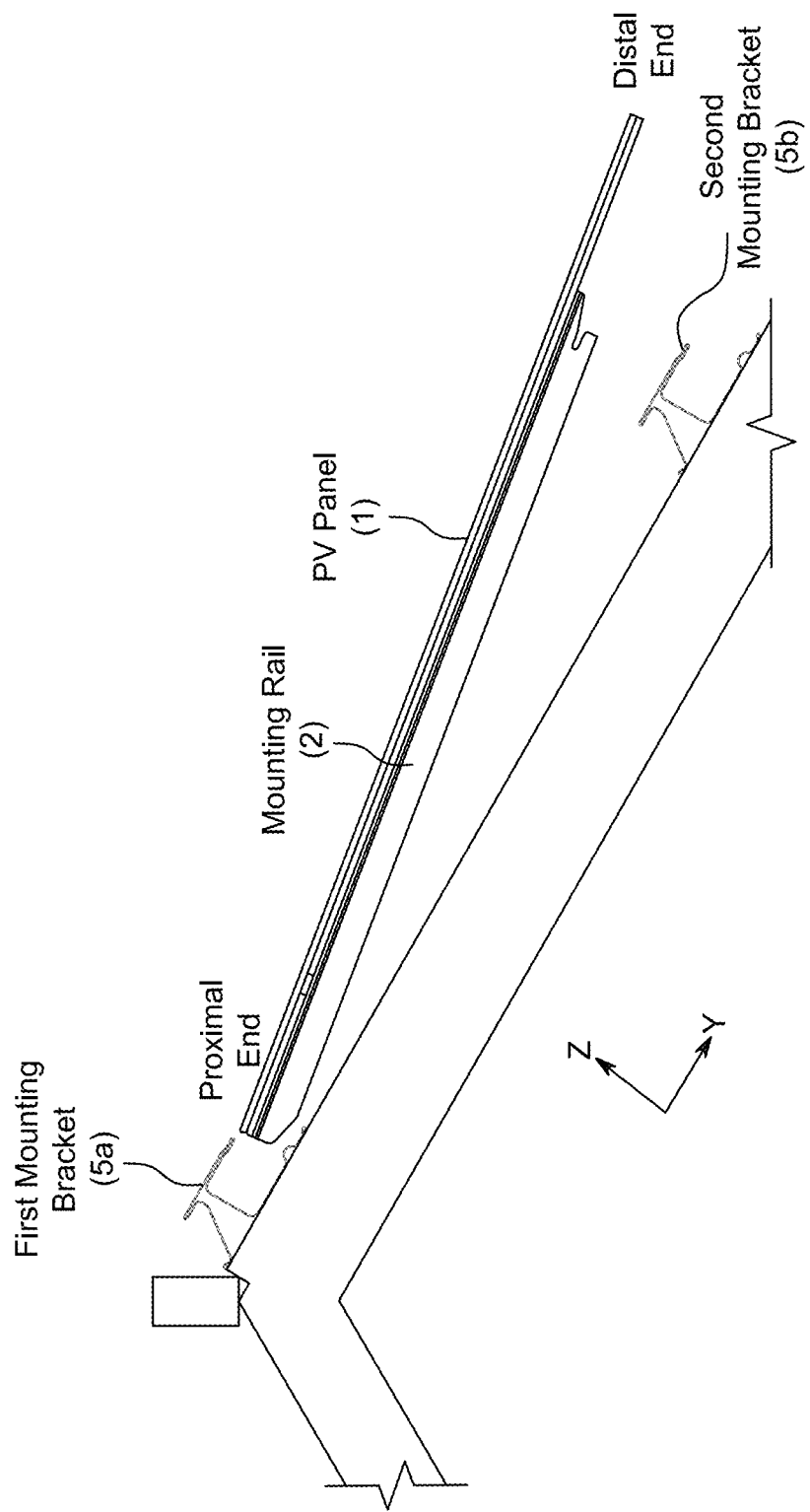
FIGS. 7A-7D show a schematic illustration of the mounting of an exemplary photovoltaic panel.
Figure 7B:
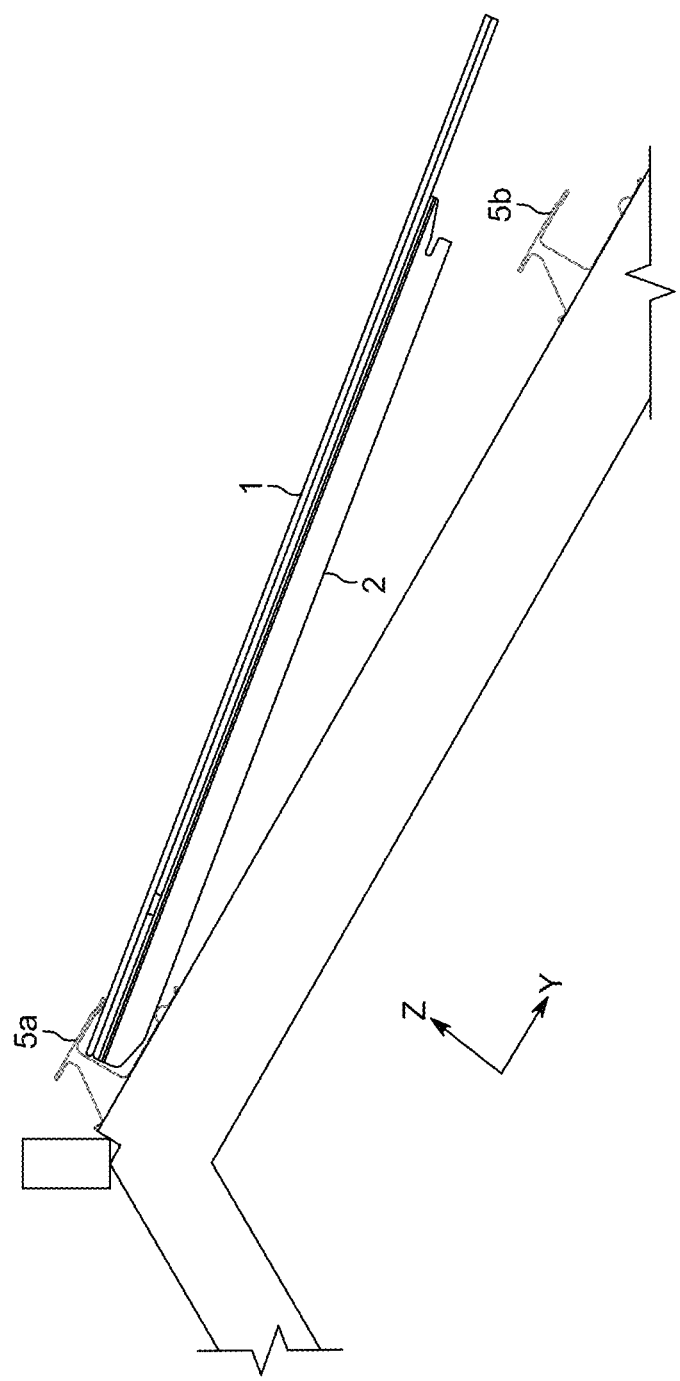
Figure 7C:
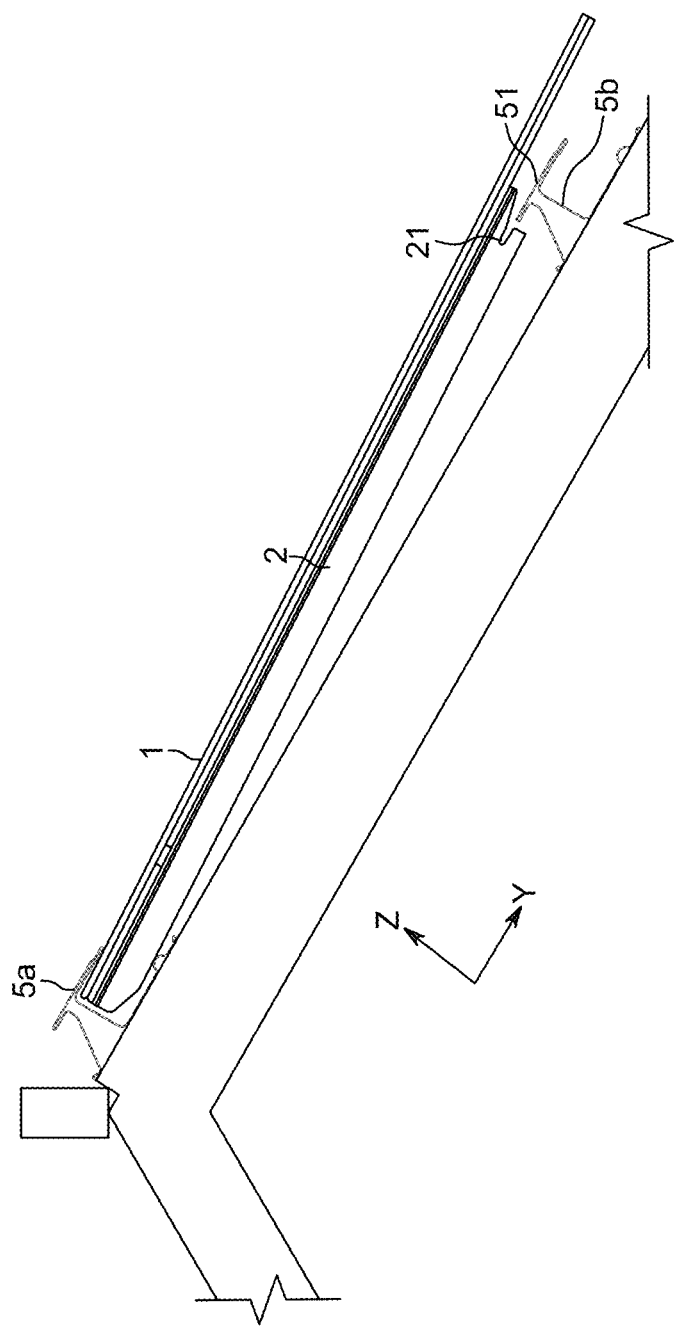
Figure 7D:
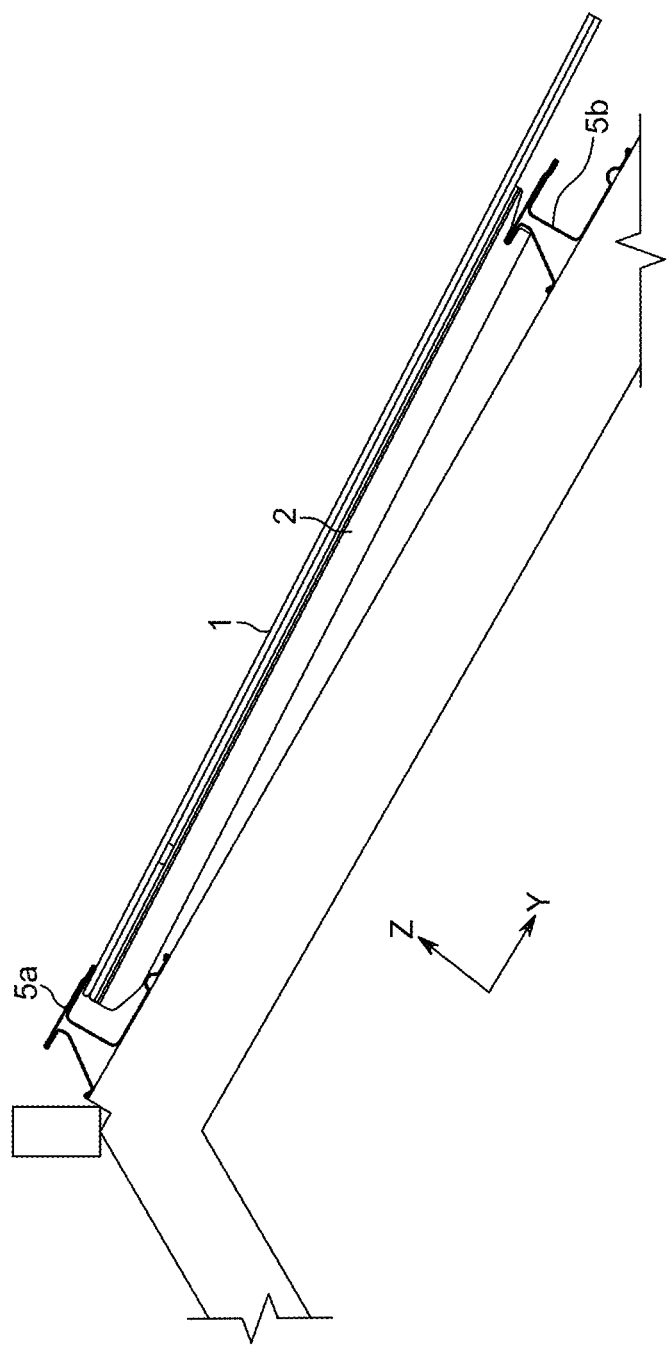

A schematic illustration of the mounting of an exemplary photovoltaic panel is depicted in FIGS. 7A-7D. In FIG. 7A, first and second mounting brackets (5a, 5b) have already been mounted on the exterior of the building, in this example a roof. To mount the photovoltaic panel (1) between the first and second mounting brackets, the proximal end of the panel is first provided at a downward angle relative to the first mounting bracket (5a). The taper formed in the proximal end will assist the panel to slide over the retention element when the proximal end is inserted between the upper and lower resilient members. Once the proximal end of the panel is placed between the upper and lower resilient members, as shown in FIG. 7B, the distal end of the panel is lowered in the z-direction towards the roof. At this point, and as shown in FIG. 7C, the distal end of the mounting rail on the panel, and more particularly the slotted recess, is arranged essentially parallel with the resilient arm of the second mounting bracket (5b). Finally, the panel is translated in the longitudinal direction (y) toward the second mounting bracket so that the resilient arm is fittingly received in the slotted recess. This completes the mounting process for one panel.

While the invention has been described herein by reference to certain embodiments, it is to be understood that modifications in addition to those described herein may be made to the structures and the techniques described herein without departing from the spirit and scope of the invention. Accordingly, although specific embodiments have been described, they are examples only and are not limiting upon the scope of the invention.

The invention claimed is:

1. A modular photovoltaic assembly configured for installation on an exterior of a building, the modular photovoltaic assembly comprising:
a photovoltaic panel (1) having a front side, a back side (15), a length in a longitudinal direction on a longitudinal axis (y) between a top edge (13) and a bottom edge (14), and a width in a transverse direction on a transverse axis (x) between a first side edge (11) and a second side edge (12),
first and second mounting rails (2a, 2b) arranged on the back side (15) and each having opposing proximal and distal ends, and
first and second mounting brackets (5a, 5b) configured to fittingly engage with each of the first and second mounting rails (2a, 2b),
each mounting bracket (5) having a width on the transverse axis (x), a length on the longitudinal axis (y) between opposing first and second lateral ends (50a, 50b), and a height on a z-axis orthogonal to the transverse (x) and longitudinal (y) axes, the first lateral end (50a) comprising a resilient arm (51) adapted to be fittingly received in a slotted recess (21) of the distal end of each mounting rail (2), the second lateral end (50b) comprising an upper resilient member (52) and a lower resilient member (53) spaced a distance apart on the z-axis, the upper and lower resilient members (52, 53) adapted to fittingly secure therebetween a portion of one of the photovoltaic panel (1), another adjacent photovoltaic panel (10), a building panel of the building, a fitting panel of the building, and a roof tile of the building.

2. The modular photovoltaic assembly of claim 1, wherein the proximal end of each mounting rail (2) is positioned proximal to the top edge (13).

3. The modular photovoltaic assembly of claim 1, wherein the upper and lower resilient members (52, 53) are arranged in parallel or essentially parallel in the longitudinal direction.

4. The modular photovoltaic assembly of claim 1, wherein the upper and lower resilient members (52, 53) each extend a length ($l_U$, $l_L$) on the longitudinal axis from a central vertical member (54) to a respective free end edge (521, 531), and $l_L > l_U$.

5. The modular photovoltaic assembly of claim 1, wherein the lower resilient member (53) comprises a retention element (55) having a length on the longitudinal axis (y) and a maximum height ($h_{max}$) on the z-axis dimensioned such that the retention element (55) contacts the portion of the photovoltaic panel (1), the another adjacent photovoltaic panel (10), the building panel, the fitting panel, or the roof tile fittingly secured between the upper and lower resilient members (52, 53).

6. The modular photovoltaic assembly of claim 5, wherein the retention element (55) has an omega shape comprising an upward sloping portion, the maximum height ($h_{max}$), and a downward sloping portion, the downward sloping portion proximal to a free end edge (531) of the lower resilient member (53).

7. The modular photovoltaic assembly of claim 5, wherein the maximum height ($h_{max}$) is equal or essentially equal to a radius of an electrical connector (3).

8. The modular photovoltaic assembly of claim 5, wherein the retention element (55) is provided on a portion of the lower resilient member (53) that extends past a free end edge (521) of the upper resilient member (52) in the longitudinal direction.

9. The modular photovoltaic assembly of claim 1, wherein the first and second lateral ends (50a, 50b) of the mounting bracket (5) each comprise a fastener notch (56a, 56b).

10. The modular photovoltaic assembly of claim 1, wherein the proximal end of each mounting rail comprises a taper from a first width (w1) to a second width (w2), whereby w1>w2.

11. The modular photovoltaic assembly of claim 1, wherein each mounting rail (2) further comprises a first pair of spacers (22a, 22b) on the proximal end and a second pair of spacers (23a, 23b) on the distal end.

12. The modular photovoltaic assembly of claim 1, wherein the first and second mounting rails (2a, 2b) and the first and second mounting brackets (5a, 5b) comprise a metal.

13. The modular photovoltaic assembly of claim 12, wherein the metal comprises a corrosion resistance coating.

14. The modular photovoltaic assembly of claim 13, wherein the corrosion resistance coating has a thickness in a range of 5 to 35 microns.

15. The modular photovoltaic assembly of claim 1, wherein each of the first and second mounting brackets (5a, 5b) comprises an elongate bracket member.

16. The modular photovoltaic assembly of claim 1, wherein the width of each of the first and second mounting brackets (5a, 5b) extends continuously along the transverse axis (x).

17. The modular photovoltaic assembly of claim 1, wherein each of the first and second mounting rails (2a, 2b) has a length on the longitudinal axis (y) that is shorter than the length of the photovoltaic panel (1).

18. The modular photovoltaic assembly of claim 1, wherein each mounting rail (2) comprises an elongate member having a unitary structure or two or more discontinuous elongate member segments.

19. The modular photovoltaic assembly of claim 1, further comprising at least one gutter panel (6) having a width on the transverse axis (x) and a length on the longitudinal axis (y), the gutter panel (6) arranged against one of the first and second side edges (11, 12) of the photovoltaic panel (1) and configured to prevent ingress of liquid or solid material underneath the photovoltaic panel (1).

20. The modular photovoltaic assembly of claim 19, wherein the gutter panel (6) comprises a vertical partition (62) extending along the length of the gutter panel (6), the vertical partition (62) dividing the width of the gutter panel (6) into first and second transverse sides (61a, 61b), and at least one longitudinal channel (63) in each of the first and second transverse sides (61a, 61b).

21. The modular photovoltaic assembly of claim 1, wherein the photovoltaic panel (1) comprises one or more electrical connectors (3), and at least one of a first electrical connector (3a) arranged on the back side (15) between the first side edge (11) and the first mounting rail (2a) and a second electrical connector (3b) arranged on the back side (15) between the second side edge (12) and the second mounting rail (2b).

22. The modular photovoltaic assembly of claim 1, wherein the photovoltaic panel (1) comprises at least one junction box (4).

23. The modular photovoltaic assembly of claim 1, wherein the exterior of the building is a roof, with or without roofing tiles, and into which the modular photovoltaic assembly is integrated.

* * * * *